US005302433A

United States Patent [19]

Miyai et al.

[11] Patent Number: 5,302,433

[45] Date of Patent: Apr. 12, 1994

[54] HEAT-MELT TRANSFER RECORDING MEDIUM

[75] Inventors: Kazuo Miyai; Motoshi Morimoto; Yuriko Kameda, all of Osaka, Japan

[73] Assignee: Fujicopian Co., Ltd., Osaka, Japan

[21] Appl. No.: 974,623

[22] Filed: Nov. 12, 1992

[30] Foreign Application Priority Data

Nov. 15, 1991 [JP] Japan .................................. 3-300576
Dec. 10, 1991 [JP] Japan .................................. 3-325857

[51] Int. Cl.[5] .................................................. B32B 7/00

[52] U.S. Cl. ...................................... 428/42; 428/195; 428/207; 428/484; 428/488.1; 428/488.4; 428/500; 428/913; 428/914

[58] Field of Search ............ 428/195, 207, 484, 488.1, 428/488.4, 913, 914, 500, 42

[56] References Cited

U.S. PATENT DOCUMENTS

| | | | |
|---|---|---|---|
| 4,555,436 | 11/1985 | Geurtsen et al. | 428/200 |
| 4,840,837 | 6/1989 | Tanaka et al. | 428/216 |
| 4,954,390 | 9/1990 | Koshizuka et al. | 428/212 |
| 5,064,743 | 11/1991 | Koshizuka et al. | 430/253 |
| 5,104,847 | 4/1992 | Hann et al. | 503/227 |
| 5,120,383 | 6/1992 | Takei et al. | 156/240 |

FOREIGN PATENT DOCUMENTS

| | | |
|---|---|---|
| 0173532 | 3/1986 | European Pat. Off. . |
| 0214770 | 3/1987 | European Pat. Off. . |
| 0227091 | 7/1987 | European Pat. Off. . |
| 2646809 | 11/1990 | France . |
| 2-150391 | 6/1990 | Japan . |
| 2-160589 | 6/1990 | Japan . |
| 3-58888 | 3/1991 | Japan . |
| 3-67694 | 3/1991 | Japan . |

*Primary Examiner*—Patrick J. Ryan
*Assistant Examiner*—Marie R. Macholl
*Attorney, Agent, or Firm*—Armstrong, Westerman, Hattori, McLeland & Naughton

[57] ABSTRACT

A heat-melt transfer recording medium including a foundation, and a release layer, a barrier layer and a colored ink layer provided on the foundation in that order from the foundation side, the release layer including a wax-like substance, the barrier layer being a substantially colorless layer including a thermoplastic resin and containing substantially no wax-like substance, and the colored ink layer including a vehicle containing not less than 50% by weight of a thermoplastic resin. The transfer recording medium has excellent transfer sensitivity and produces print images having excellent smear resistance, abrasion resistance and alcohol resistance.

5 Claims, No Drawings

HEAT-MELT TRANSFER RECORDING MEDIUM

BACKGROUND OF THE INVENTION

The present invention relates to a heat-melt transfer recording medium capable of producing print images having excellent smear resistance, abrasion resistance and alcohol resistance.

Heretofore, heat-melt transfer recording media have been widely used in a variety of printing apparatuses. However, in the case of heat-melt transfer recording media for bar code printing, label printing and rough paper printing wherein the main object of printing is paper having a poor surface smoothness, among the above-mentioned heat-melt transfer recording media, the problem that print images are insufficent in durability properties such as smear resistance (resistance to receptor-staining) and abrasion resistance is encountered.

For instance, a printed matter obtained by using such conventional recording medium for bar code printing does not necessarily satisfy the essential requirements for bar code printing that even though the image surface is rubbed a little, the image is not damaged and the white ground portions of the receptor paper are not stained, and the image can be accurately read by means of a bar code reader, and that when stains on the printed matter are wiped off with alcohol, the ink is not dissolved into the alcohol. When a printed matter obtained by using these conventional recording media is passed through a facsimile machine, the print image is rubbed with a sliding member provided inside the machine, so that the print image, in some cases, is peeled partially or scratches occur in the print image. In the case of a printed matter obtained by printing on a rough paper having a Bekk smoothness of about 20 seconds, the print image, in some cases, becomes unclear merely by rubbing the surface of the printed matter with the finger, etc.

Various attempts were made to improve the durability of print image. However, in the case of a method wherein the colored ink layer is enriched with a resin, the durability-improving effect is not sufficient and the transferability becomes poor. In the case of a method wherein a release layer mainly composed of a wax is interposed between the foundation and the colored ink layer to improve the transferability of the ink layer and to exhibit a function of protecting the obtained print image after printing, the protective effect is small because the resulting wax layer on the surface of the print image has a small strength.

Thus, there has not been obtained any heat-melt transfer recording medium satisfying both the durability and the quality of print image.

An object of the present invention is to provide a heat-melt transfer recording medium which has excellent transfer sensitivity and can give print images having excellent durability properties without any deterioration in the quality of the print images.

This and other objects of the invention will become apparent from the description hereinafter.

SUMMARY OF THE INVENTION

The present invention provides a heat-melt transfer recording medium comprising a foundation, and a release layer, a barrier layer and a colored ink layer provided on the foundation in that order from the foundation side, the release layer comprising a wax-like substance, the barrier layer being a substantially colorless layer comprising a thermoplastic resin and containing substantially no wax-like substance, and the colored ink layer comprising a vehicle containing not less than 50% by weight of a thermoplastic resin.

DETAILED DESCRIPTION

The heat-melt transfer recording medium of the present invention has a three-layer structure wherein a substantially colorless barrier layer having a great film strength between a release layer provided on the foundation and a colored ink layer. When the transfer recording medium is heated with the thermal head of a thermal printer from the foundation side, the three layers on the foundation are melted and transferred to a receptor. Print images obtained by using the transfer recording medium are improved in smear resistance and abrasion resistance due to such three-layer structure.

The barrier layer in the present invention has the function of protecting print images from mechanical actions such as abrasion and chemical action of alcohol, when the layers of the instant transfer recording medium are transferred to a receptor by heating with a thermal head.

The barrier layer is a substantially colorless layer composed of a thermoplastic resin and containing substantially no wax-like substance. It is undesirable to incorporate a wax-like substance into the barrier layer, because the function of protecting print image becomes poor. The barrier layer is preferably composed substantially of only a thermoplastic resin.

It is preferable to use a relatively hard resin as the thermoplastic resin for the barrier layer. Examples of the preferred resin are polyalkyl methacrylates which has a number average molecular weight of $10\times10^3$ to $50\times10^4$ and wherein the alkyl group contains 1 to 18 carbon atoms, particularly 1 to 4 carbon atoms. Examples of the alkyl group include methyl, ethyl, n-butyl, isobutyl and tert-butyl. Such alkyl methacrylates may be used singly or in combination. That is, the polyalkyl methacrylates used in the present invention may be homopolymers or copolymers. The polyalkyl methacrylates may be used singly or in admixtures.

The barrier layer can be formed by applying a solution of the polyalkyl methacrylate in an appropriate solvent such as methyl ethyl ketone, tetrahydrofuran or toluene onto the release layer by means of a usual coater such as bar coater or gravure coater. The coating amount is preferably from 0.01 to 3.0 $g/m^2$, more preferably from 0.1 to 1.0 $g/m^2$, on solid basis after being dried.

The above-mentioned barrier layer is composed of a hard resin insoluble in alcohol and therefore protects print images on a receptor from mechanical action, dissolution with alcohol, etc.

In the present invention, the release layer is provided between the foundation and the barrier layer. The release layer has the function of facilitating the removal of the barrier layer together with the colored ink layer from the foundation upon printing and is mainly composed of a wax-like substance.

Examples of the wax-like substance include natural waxes such as haze wax, bees wax, carnauba wax, candelilla wax, montan wax and ceresine wax; petroleum waxes such as paraffin wax and microcrystalline wax; synthetic waxes such as oxidized wax, ester wax, low molecular weight polyethylene, α-olefin wax and Fischer-Tropsch wax; higher fatty acids such as myristic acid, palmitic acid, stearic acid and behenic acid; higher aliphatic alcohols such as stearyl alcohol and docosanol; esters such as higher fatty acid monoglycerides, sucrose fatty acid esters and sorbitan fatty acid esters; and amides and bisamides such as stearic acid amide and oleic acid amide. These wax-like substances may be used singly or in combination. From the viewpoint of thermal transfer sensitivity, the preferred wax-like substances are those having a melting temperature of 40° to 120° C.

The release layer can be formed by applying to a foundation a solvent solution, a solvent dispersion or an emulsion of the above-mentioned wax-like substance, or a dispersion of microcrystals of the wax-like substance which dispersion is prepared by adding a nonsolvent or a poor solvent to a solvent solution of the wax, by means of an appropriate coating means such as bar coater or gravure coater, followed by drying. The release layer can also be formed by hot-melt coating of the wax-like substance. The amount of the release layer applied onto the foundation is preferably from about 0.01 to about 3.0 g/$m^2$ on solid basis.

The colored ink layer in the present invention is a layer wherein a coloring agent is dispersed in a vehicle, and provided on the barrier layer.

The vehicle preferably contains not less than 50% (% by weight, hereinafter the same) of a thermoplastic resin. The most preferred vehicle is composed of substantially a thermoplastic resin alone. However, the vehicle may contain a tackifier resin or a wax-like substance in addition to the thermoplastic resin.

Examples of the thermoplastic resin include ethylene copolymers such as ethylene-vinyl acetate copolymer, ethylene-vinyl butyrate copolymer, ethylene-(meth)acrylic acid copolymer, ethylene-alkyl (meth)acrylate copolymer wherein examples of the alkyl group are those groups having 1 to 16 carbon atoms, such as methyl, ethyl, propyl, butyl, hexyl, heptyl, octyl, 2-ethylhexyl, nonyl, dodecyl and hexadecyl, ethylene-acrylonitrile copolymer, ethylene-acrylamide copolymer, ethylene-N-methylolacrylamide copolymer and ethylene-styrene copolymer; poly(meth)acrylic acid esters such as polydodecyl methacrylate and polyhexyl acrylate; vinyl chloride polymer and copolymers such as polyvinyl chloride, vinyl chloride-vinyl acetate copolymer and vinyl chloride-vinyl alcohol copolymer; polyesters such as sebacic acid-decanediol polymer, azelaic acid-dodecanediol polymer and azelaic acid-hexadecanediol polymer; and phenoxy resins. These resins may be used singly or in combination. From the viewpoint of thermal transfer sensitivity, the preferred thermoplastic resins are those having a melting or softening temperature of 40° to 120° C. (value measured by DSC, hereinafter the same).

Preferred examples of the tackifier resin include natural resins such as rosins, rosin-modified resins and terpene resins; synthetic resins including petroleum resins such as resins of $C_5$ aliphatic or alicyclic hydrocarbons and derivatives thereof, resins of $C_9$ aromatic or alicyclic hydrocarbons and derivatives thereof, and homopolymers or copolymers of styrene, α-methylstyrene or isopropyltoluene, dicyclopentadiene resin, aromatic addition-condensation type petroluem resins and coumarone-indene resins; and other synthetic resins such as xylene resin, phenolic resins, styrene-maleic anhydride resins and ketone resins.

In the case of using the wax-like substance, all examples of the wax-like substances used in the above-mentioned release layer can be used.

When the wax-like substance and/or the tackifier resin are used together with the thermoplastic resin, the amount thereof is less than 50%, preferably less than 25%, on the basis of the amount of the vehicle.

As the coloring agent, there can be suitably used a variety of inorganic or organic pigments and dyes conventionally used as the coloring agent for heatmeltable transfer ink, and magnetic powders, metal powders and fluoresent pigments and dyes. The amount of the coloring agent used is preferably from about 5 to about 70%, more preferably from about 15 to about 35%, on the basis of the total amount of the solid components of the colored ink layer.

The colored ink layer can be formed by applying to the barrier layer a coating liquid prepared by dissolving or dispersing the vehicle material and the coloring agent into an appropriate solvent, by means of an appropriate coating method such as bar coating or gravure coating, followed by drying. Usually the coating amount is from 0.2 to 4.0 g/$m^2$ on solid basis after being dried.

In the present invention, a body pigment or a filler can be incorporated into the colored ink layer in a small amount, for example, in an amount of not more than 10% on the basis of the total amount of the solid components of the colored ink layer.

A variety of plastic films commonly used as a foundation film for this type of ink ribbon, including polyester films such as polyethylene terephthalate film and polyethylene naphthalate film, polycarbonate film, polyamide films, aramid film, and the like, can be used as the foundation in the present invention. High density thin papers such as condenser paper can also be used as the foundation. In the case of using such plastic films, there is preferably provided on the rear surface of the foundation (the surface in sliding contact with a thermal head) a conventional stick-preventing layer composed of one or more of various lubricative heat-resistant resins such as silicone resin, fluorine-containing resin and nitrocellulose, other resins modified with the foregoing lubricative heat-resistant resins, and mixtures of the foregoing resins with lubricating agents. The thickness of the foundation is preferably from about 1.5 to about 10 μm, more preferably from about 2 to about 7 μm from the viewpoint of ensuring good heat conduction.

When the heat-melt transfer recording medium of the present invention is heated by means of a thermal head from the foundation side, the layers on the foundation are melted to be transfered onto a receptor. The transferred image is composed of the colored ink layer, the barrier layer and the release layer in that order from the receptor side. Therefore, the colored ink layer is protected with the alcohol-insoluble, hard resin of the barrier layer, and further the wax of the release layer. Thus the transferred image has excellent smear resistance, abrasion resistance and alcohol resistance.

The present invention is more specifically described and explained by means of the following Examples. It is to be understood that the present invention is not limited to the Examples, and various change and modifications may be made in the invention without departing from the spirit and scope thereof.

EXAMPLES 1 TO 4 AND COMPARATIVE EXAMPLES 1 AND 2

Onto polyethylene terephthalate film having a thickness of 4.5 μm were applied a release layer composition, a barrier layer composition and a colored ink layer composition each having the formula shown in Table 1 in that order by means of a gravure coater to give heat-melt transfer recording media. The coating amount of each layer is shown in Table 1.

TABLE 1

| | Ex. 1 | Ex. 2 | Ex. 3 | Ex. 4 | Com. Ex. 1 | Com. Ex. 2 |
|---|---|---|---|---|---|---|
| Release layer | | | | | | |
| Formula (part by weight) | | | | | | |
| α-Olefin wax | 3.0 | 3.0 | 3.0 | 3.0 | — | 3.0 |
| Candelilla wax | 3.0 | 3.0 | 3.0 | 3.0 | — | 3.0 |
| Toluene | 47.0 | 47.0 | 47.0 | 47.0 | — | 47.0 |
| Isopropyl alcohol | 47.0 | 47.0 | 47.0 | 47.0 | — | 47.0 |
| Coating amount (solid basis, g/m$^2$) | 0.3 | 0.3 | 0.3 | 0.3 | — | 0.3 |
| Barrier layer | | | | | | |
| Formula (part by weight) | | | | | | |
| Polymethyl methacylate*1 | 7.0 | — | 7.0 | 7.0 | — | — |
| Polyethyl methacrylate*2 | — | 7.0 | — | — | — | — |
| Methyl ethyl ketone | 93.0 | 93.0 | 93.0 | 93.0 | — | — |
| Coating amount (solid basis, g/m$^2$) | 0.5 | 0.5 | 0.5 | 0.5 | — | — |
| Colored ink layer | | | | | | |
| Formula (part by weight) | | | | | | |
| Acrylic resin | 13.0 | 13.0 | 13.0 | 13.0 | 13.0 | 13.0 |
| Vinyl acetate resin | 1.0 | 1.0 | 1.0 | 1.0 | 1.0 | 1.0 |
| Phenoxy resin*3 | 1.0 | 1.0 | — | — | 1.0 | 1.0 |
| α-Methylstyrene resin | — | — | 1.0 | — | — | — |
| Carnauba wax | — | — | — | 1.0 | — | — |
| Carbon black | 3.0 | 3.0 | 3.0 | 3.0 | 3.0 | 3.0 |
| Dispersing agent*4 | 0.5 | 0.5 | 0.5 | 0.5 | 0.5 | 0.5 |
| Methyl ethyl ketone | 78.5 | 78.5 | 78.5 | 78.5 | 78.5 | 78.5 |
| Distilled water | 3.0 | 3.0 | 3.0 | 3.0 | 3.0 | 3.0 |
| Coating amount (solid basis, g/m$^2$) | 1.0 | 1.0 | 1.0 | 1.0 | 1.0 | 1.0 |

*1 Number average molecular weight: $95 \times 10^3$
*2 Number average molecular weight: $28 \times 10^3$
*3 PKHM-30 made by Union Carbide Corp.
*4 SI-10T made by Nikko Chemicals Co., Ltd.

The obtained heat-melt transfer recording medium were evaluated. The results of the evaluation are shown in Table 2.

The properties evaluated and evaluation method thereof are as follows:

(1) Transferability (sensitivity)

Print images were formed on a receptor comprising polyethylene terephthalate film as a base by using a bar code printer (B-30 made by Tokyo Electric Co., Ltd.). The energy applied to the thermal head when a print image readable with a scanner was obtained was determined. The transferability (sensitivity) was evaluated in terms of the energy.

○ . . . Readable image is obtained with an energy of less than 20 mJ/mm$^2$.

Δ . . . Readable image is obtained with an energy of 20 to 25 mJ/mm$^2$.

X . . . Readable image is obtained with an energy of more than 25 mJ/mm$^2$.

(2) Smear resistance (receptor-staining resistance)

Employing a rubbing tester (Rub Tester made by Yasuda Seiki Kabushiki Kaisha), a corrugated fiberboard was moved to and fro 100 times on the bar code bearing surface of the printed receptor obtained in the same manner as in (1) under a load of 250 g/cm$^2$. The degree of staining of the white ground portion of the receptor was evaluated.

○ . . . The white ground portion is not stained at all.

Δ . . . The white ground portion is slightly stained.

X . . . The white ground portion is markedly stained.

(3) Abrasion resistance

Employing a rubbing tester (Rub Tester made by Yasuda Seiki Kabushiki Kaisha), a rubber eraser containing sand was moved to and fro 10 times on the bar code bearing surface of the printed receptor obtained in the same manner as in (1) under a load of 250 g/cm$^2$. The degree of shaving of the bar code image was observed.

○ . . . The image is not shaved at all.

Δ . . . The image is slightly shaved.

X . . . The image is markedly shaved.

(4) Alcohol resistance

Employing a crock meter made by ATLAS ELECTRIC DEVICE COMPANY, a cloth dampened with ethyl alcohol was moved to and fro 10 times on the bar code bearing surface of the printed receptor obtained in the same manner as in (1) under a load of 500 g/cm$^2$. The degree of staining of the image bearing surface, particularly the white ground portion was observed.

○ . . . The image bearing surface is not stained at all.

Δ . . . The image bearing surface is slightly stained.

X . . . The image bearing surface is markedly stained.

TABLE 2

| | Ex. 1 | Ex. 2 | Ex. 3 | Ex. 4 | Com. Ex. 1 | Com. Ex. 2 |
|---|---|---|---|---|---|---|
| Transferability | Δ | Δ | Δ | Δ | X | Δ |
| Smear resistance | ○ | ○ | ○ | ○ | ○ | Δ |
| Abrasion resistance | ○ | ○ | ○ | ○ | Δ | Δ |
| Alcohol resistance | ○ | ○ | ○ | ○ | ○ | Δ |

As is clear from Table 2, the instant heat-melt transfer recording medium has excellent sensitivity and the print images obtained by using the instant heat-melt transfer recording medium have a balance of smear resistance, abrasion resistance and alcohol resistance.

In addition to the materials and ingredients used in the Examples, other materials and ingredients can be used in the Examples as set forth in the specification to obtain substantially the same results.

What we claim is:

1. A heat-melt transfer recording medium comprising a foundation, and a release layer, a barrier layer and a colored ink layer provided on the foundation in that order from the foundation side, the release layer comprising a wax, the barrier layer consisting essentially of a polyalkyl methacrylate having a number average molecular weight of from $10^4$ to $5.0\times10^5$ and the colored ink layer comprising a coloring agent dispersed in a vehicle comprising not less than 50% by weight of a thermoplastic resin.

2. The heat-melt transfer recording medium of claim 1, wherein the vehicle of the colored ink layer consists essentially of a thermoplastic resin.

3. The heat-melt transfer recording medium of claim 1, wherein the polyalkyl methacrylate is at least one selected from the group consisting of homopolymers of methyl methacrylate, ethyl methacrylate, butyl methacrylate, isobutyl methacrylate or tert-butyl methacrylate, and copolymers of at least two of the foregoing monomers.

4. The heat-melt transfer recording medium of claim 1, wherein the vehicle of the colored ink layer further comprises less than 50% by weight of at least one of a wax and a tackifier resin.

5. The heat-melt transfer recording medium of claim 1, wherein the vehicle of the colored ink layer further comprises less than 25% by weight of at least one of a wax and a tackifier resin.

* * * * *